(12) United States Patent
Okada et al.

(10) Patent No.: US 6,168,330 B1
(45) Date of Patent: Jan. 2, 2001

(54) ELECTRONIC EQUIPMENT COMPRISING THIN KEYBOARD SWITCH

(75) Inventors: Hiroyasu Okada, Hyogo; Takefumi Inoue; Seiji Yoshii, both of Osaka; Toshifumi Hiroe, Fukui, all of (JP)

(73) Assignee: Matsushita Electric Industrial Co., Ltd., Osaka (JP)

(*) Notice: Under 35 U.S.C. 154(b), the term of this patent shall be extended for 0 days.

(21) Appl. No.: 09/426,271

(22) Filed: Oct. 25, 1999

(30) Foreign Application Priority Data

Oct. 23, 1998 (JP) ................................... 10-302479

(51) Int. Cl.[7] ....................................................... B41J 5/16
(52) U.S. Cl. ............................................... 400/472; 400/495
(58) Field of Search ..................................... 400/472, 495, 400/491, 490; 341/22, 21; 361/680, 681

(56) References Cited

U.S. PATENT DOCUMENTS

| | | | |
|---|---|---|---|
| 4,876,415 | 10/1989 | Clancy | 200/5 A |
| 5,255,154 | * 10/1993 | Hosoi et al. | 361/680 |
| 5,268,816 | * 12/1993 | Abell et al. | 361/729 |
| 5,329,422 | * 7/1994 | Sasaki | 361/686 |
| 5,358,344 | 10/1994 | Spence | 400/490 |
| 5,414,420 | * 5/1995 | Puckette et al. | 341/20 |
| 5,539,615 | * 7/1996 | Sellers | 361/680 |
| 5,694,124 | 12/1997 | Wood | 341/22 |

* cited by examiner

Primary Examiner—John S. Hilten
Assistant Examiner—Anthony H. Nguyen
(74) Attorney, Agent, or Firm—Ratner & Prestia

(57) ABSTRACT

At an end of a bottom board 21 of an upper case 19 holding a thin keyboard switch 16, a substantially large opening 22 that allows a connector sheet 17 drawn from a rear end of the keyboard switch to pass through with a sufficient margin is provided, the connector sheet 17 is provided with at least one hole 18 at the middle part in the width direction, and a protrusion 23 is provided protruding from a frame portion 20 of the upper case as the constituent part towards the opening 22, which protrusion penetrating through the hole 18 of connector sheet 17, as it is being folded down forward, for supporting a baseboard 5 from the bottom surface. With the above described structure, the fabricating operation for connecting the connector sheet 17 can be accomplished easier and surer.

6 Claims, 6 Drawing Sheets

ELECTRONIC EQUIPMENT COMPRISING THIN KEYBOARD SWITCH

FIELD OF THE INVENTION

The present invention relates to an electronic equipment comprising a thin keyboard switch, such as a portable personal computer.

BACKGROUND OF THE INVENTION

A conventional technology is described with reference to FIG. 6 through FIG. 10, using a portable personal computer as an exemplary equipment. FIG. 6 is a vertical cross sectional view of a conventional portable personal computer. FIG. 7A is a plan view of thin keyboard switch used in the portable personal computer. FIG. 7B shows a cross section in switch portion of the keyboard. FIG. 8 is a plan view of an upper case for the keyboard, while FIG. 9 shows a plan view of a bottom case. FIG. 10 illustrates how a connection sheet is connected.

A thin keyboard switch 1 is formed of switching contact points 3 corresponding to respective push buttons 2 provided for a certain specific number on a rigid baseboard 5, for example a metal board, and switch sheets 4 made of a flexible insulating sheet material sandwiching the push buttons. At a rear end, a connector sheet 6 having a certain width formed of the same flexible insulating sheet material used for the switch sheet 4 is drawn from a space between the baseboard 5 and the push buttons 2.

An upper case 7 for housing and holding the keyboard switch 1 is formed of a frame portion 8 surrounding the keyboard switch 1 and a bottom board 9, and is provided with an oblong slit 10 at a border between the rear end of the bottom board 9 and the frame portion 8 for allowing the connector sheet 6 to go through when the keyboard switch 1 is mounted thereon.

A bottom case 11 is for housing the upper case 7, which bears the keyboard switch 1, at the upper portion, and houses at the bottom portion a certain specific electronic circuit (not shown) and a circuit board 13 containing a connector 12. The connector sheet 6 coming through the slit 10 and folded down forward is connected and fixed at the tip end to the connector 12. A covering lid 15 including a display portion 14 is hinged to a side of the bottom case 11. The bottom case 11 and the covering lid 15 constitute an outer casing for the portable personal computer.

For mounting the keyboard switch 1 and connecting the connector sheet 6 to the circuit board 13 stored in the bottom case 11 during assembly of the portable personal computer, the connector sheet 6 is pulled out of the upper case 7 through the slit 10, and then folded down forward to be inserted at the tip end for connection and fixation in the mouth of connector 12, as shown in FIG. 10. And then the upper case 7 is mounted and fixed on the upper portion of the bottom case 11.

Passing the connector sheet 6 through the slit 10, and then folding and connecting it to the connector 12 are the troublesome manual operations to be conducted by the hands of an operator at a narrow nook within the bottom case 11. The operations have been forming a bottleneck in the assembly of portable personal computers.

In order to make the passing and folding operations for the connector sheet 6 easier, one may think of broadening the slit 10 in the bottom board 9. However, the broader slit signifies that the bottom board 9 is unable to provide a support against the reverse surface of the baseboard 5 in the corresponding area. This creates another problem that the press of a push button 2 locating above the broader slit causes a local downward deflection of keyboard switch 1.

SUMMARY OF THE INVENTION

The present invention aims to offer an electronic equipment comprising a thin keyboard switch, with which the fabricating operation for connecting a connector sheet drawn from a rear portion of the keyboard switch to a circuit board stored in the bottom case is easy, yet the keyboard switch does not make a local downward deflection during keyboard operation.

An upper case for housing a thin keyboard switch of electronic equipment is provided with an opening at one end of the bottom board for allowing a connector sheet drawn from the rear end portion of the keyboard switch to pass through, the connector sheet is provided with at least one hole at a middle part in the width direction, and a protrusion for supporting baseboard of the keyboard switch from the reverse surface penetrating through the hole of the connector sheet as it is being folded down forward is provided within the opening of upper case. With the above described structure, the protrusion provided for supporting the baseboard prevents the keyboard switch from making a local deflection, despite the broadened opening. Also, during mounting operation of the keyboard switch, the connecting of connector sheet to circuit board stored within the bottom case can be performed easily by the hands of an operator.

It is preferred that the protrusion is protruding from the frame portion of upper case as the constituent part towards the opening provided in the bottom board of the upper case. With the above described structure, the reverse surface of baseboard of a thin keyboard switch may be supported on substantially a same level, irrespective of the locality whether it is above the bottom board, or above the opening area of the bottom board, of the upper case.

It is also preferred that the protrusion is provided erected upright on the bottom of the bottom case as the constituent part in the area of the opening formed in the bottom board of the upper case. With the above described structure, a keyboard switch can withstand even a stronger force exerted on a push button locating above the opening.

It is also preferred that the opening of bottom board of the upper case is sufficiently larger than the size needed for the connector sheet to pass through, yet it is within a range where occurrence of the deflection in keyboard switch is preventable by means of the protrusion. Under the above described structure, the operation of connecting a connector sheet to a circuit board disposed in the bottom case will become easier, and the overall fabricating operation smoother.

DESCRIPTION OF THE PREFERRED EMBODIMENTS

Figure 1:
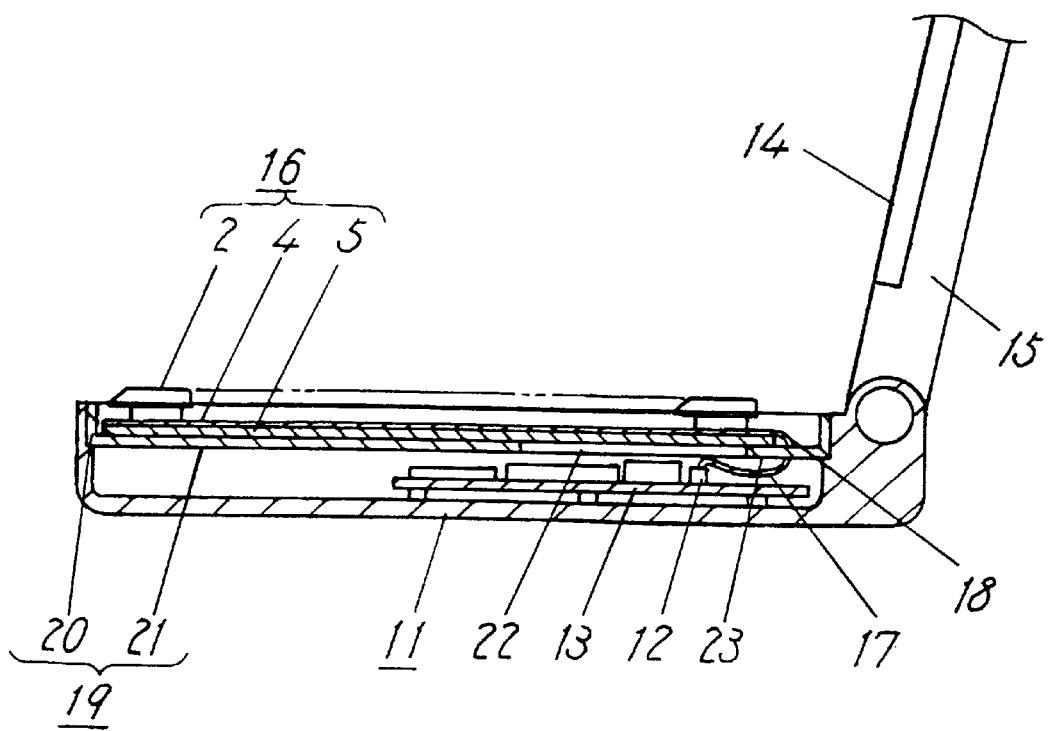
FIG. 1 is a cross sectional view showing a portable personal computer, or an electronic equipment comprising a thin keyboard switch, in accordance with a first exemplary embodiment of the present invention.
Figure 2:
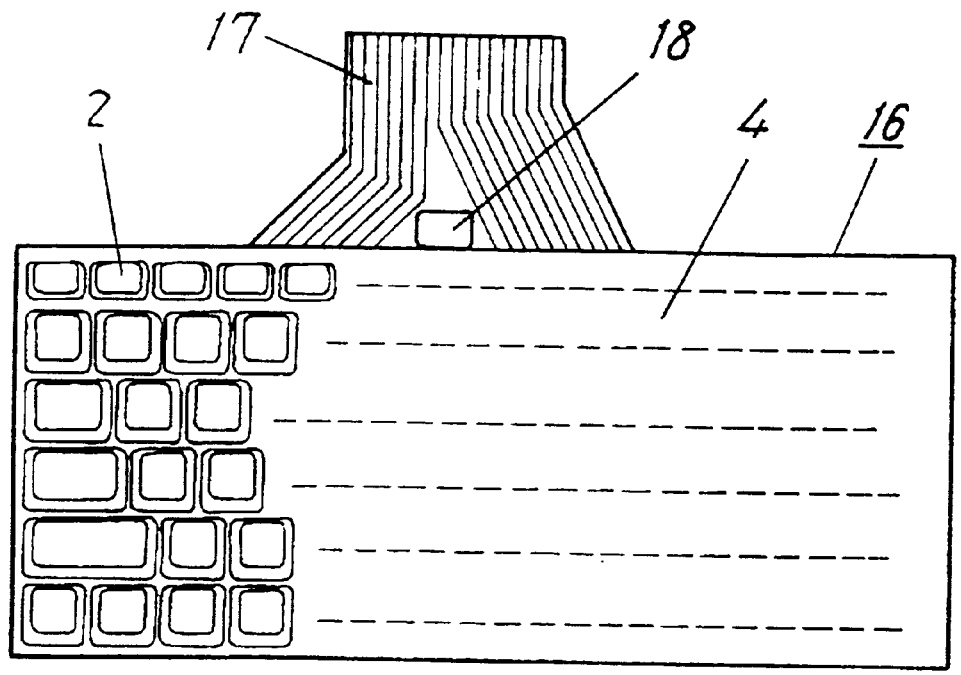
FIG. 2 is a plan view of the keyboard switch.
Figure 3:
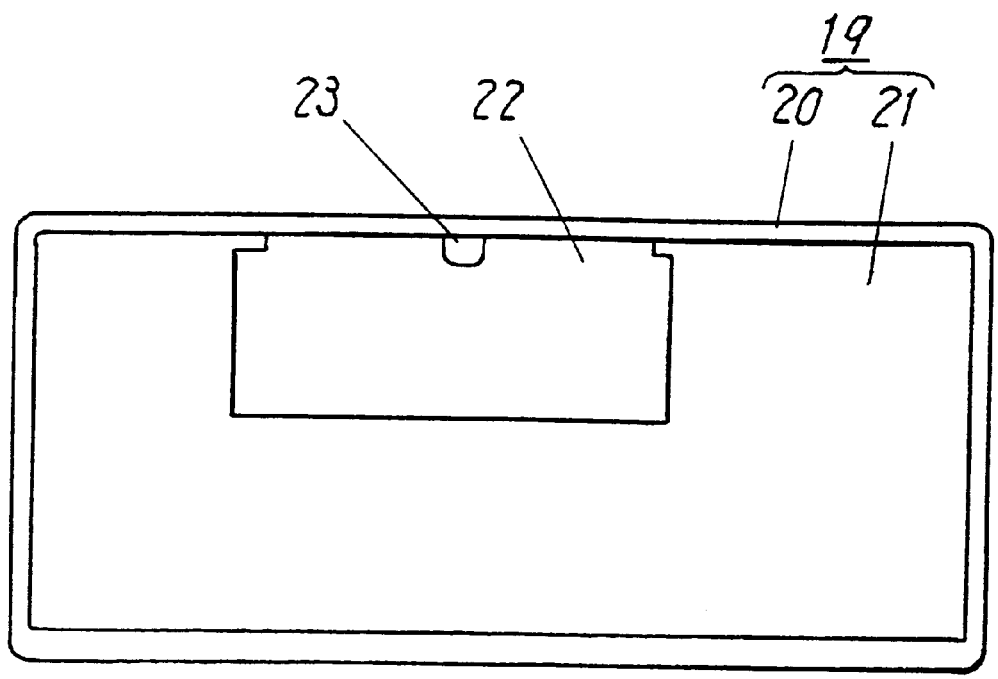
FIG. 3 is a plan view of an upper case for housing the keyboard switch.

Exemplary embodiments of the present invention are described in the following with reference to FIG. 1 through FIG. 5.

Those portions having the same structure as those described in the conventional examples are represented by providing the same symbols, and detailed descriptions of which have been omitted.

(Embodiment 1)

Referring to FIG. 1 through FIG. 4, a thin keyboard switch 16 comprises switching contact points 3 corresponding to respective push buttons 2 provided for a certain specific number on a rigid baseboard 5, for example a metal board, with a switch sheet 4 made of a flexible insulating sheet material interposed in between. At a rear end, a connector sheet 17 having a certain width formed of the same flexible insulating sheet material used for the switch sheet 4 is drawn from a space between the baseboard 5 and the push buttons 2. The connector sheet 17 having a certain width is provided with a hole 18 of rather oblong shape in a place close to an end part at the middle part of the width direction. For facilitating to perforate the hole 18, it is preferred to form the connector sheet 17 in the shape of a character Y at the place close to the end part.

An upper case 19 for housing and holding the keyboard switch 16 is formed of a frame portion 20 surrounding the keyboard switch 16 and a bottom board 21. Provided at a border region of the rear portion of bottom board 21 and the frame portion 20 is an opening 22 that is large enough to allow the connector sheet 17 to pass through with a sufficient margin. The opening 22 is provided with a supporting protrusion 23, which protrusion is protruding towards inside of the opening from the frame portion 20 forming the constituent part. The protrusion 23, which penetrates through the hole 18 of the connector sheet 17, supports the baseboard 5 from the bottom surface.

A bottom case 11 houses the upper case 19, which holds the keyboard switch 16, at the upper portion, and stores at the bottom portion a certain specific electronic circuit (not shown) and a circuit board 13 having a connector 12, which connector being connection means for connecting and fixing the tip end of connector sheet 17. A covering lid 15 containing a display portion 14 is hinged to a side of the bottom case 11. The bottom case 11 and the covering lid 15 constitute an outer casing for the portable personal computer.

Now in the following, how the keyboard switch 16 is mounted and the connector sheet 17 is connected to the circuit board 13 stored in the bottom case 11 during fabrication of the portable personal computer is described.

Figure 4:
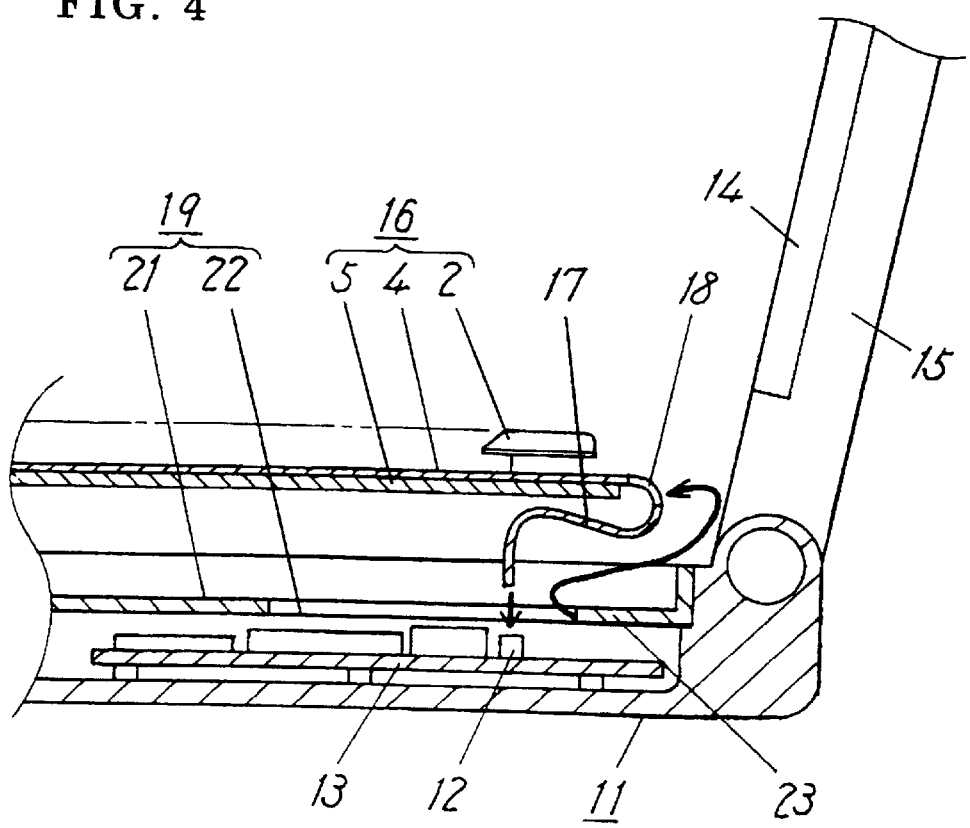
FIG. 4 is a cross sectional side view used to describe connection of the connector sheet of keyboard switch.

As shown in FIG. 4, first the upper case 19 is placed on the upper part of the bottom case 11, and then the connector sheet 17 drawn from the rear part of the keyboard switch 16 is folded down forward and guided to pass through the opening 22 provided in a rear part of the bottom board 21 of upper case 19. The connector sheet 17 at the tip end is inserted and fixed in the connector 12 of the circuit board 13 locating under the opening 22. Then, the connector sheet 17 is organized so that the protrusion 23 penetrates through the hole 18 of the connector sheet 17 to make direct contact with the bottom surface of the baseboard 5, and then the keyboard switch 16 is installed and fixed within the upper case 19.

As described in the above, during the operations for mounting a keyboard switch on a portable personal computer in accordance with the present embodiment, passing of the connector sheet 17 drawn from keyboard switch 16 through the opening 22 and connecting of the tip end to the connector 12 can be made easily because the opening 22 provided in the upper case 19 is large enough. In the mean time, because of the existence of the protrusion 23 protruding from the frame portion 20 the bottom surface of baseboard 5 is supported on substantially the same level as the bottom board 21, and a pressure given on the keyboard switch 16 during keyboard operation will not cause the local downward deflection in the keyboard switch 16.

Depending on needs, the protrusion 23 and the hole 18 in the connector sheet 17 may be provided for two or in more numbers. The opening 22 has been provided to be large enough for allowing the connector sheet 17 to pass through with a sufficient margin. The larger the size of the opening 22 the better, in so far as a keyboard switch 16 does not cause a local downward deflection, when a push button 2 in an area corresponding to the opening 22 and supported by the protrusion 23 from the bottom surface is pressed. The operation of connecting the connector sheet 17 to the connector 12 becomes easier with a larger opening 22. The total fabricating operation may be streamlined more smoothly especially when the opening 22 has a rectangular shape of which the length of one side is 30 mm–90 mm and that of the other side is 50 mm–150 mm. The size of the hole 18 should preferably be sufficiently larger relative to that of the protrusion 23.

(Embodiment 2)

Figure 5:
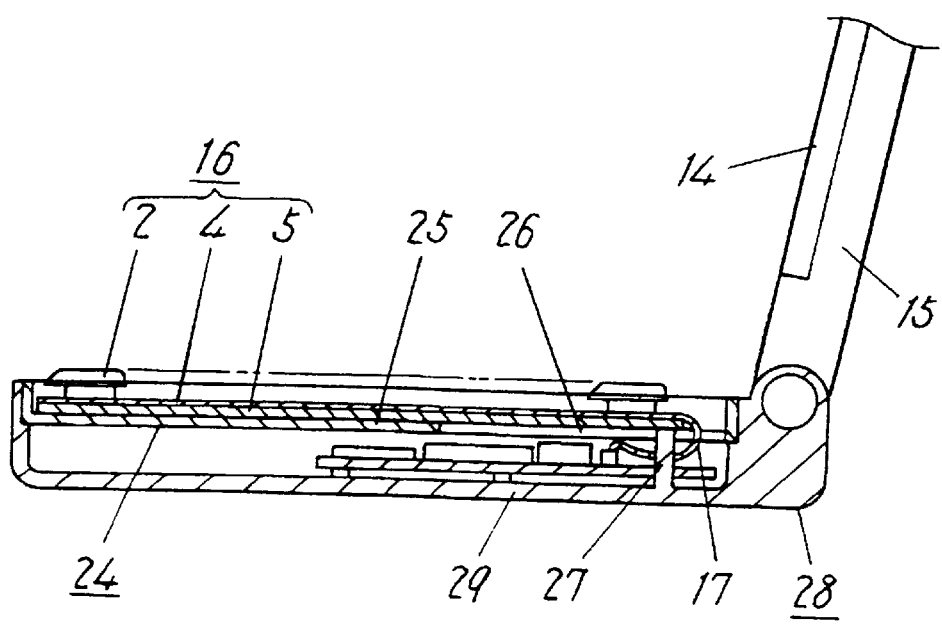
FIG. 5 is a cross sectional side view of a portable personal computer in accordance with a second exemplary embodiment of the present invention.
Figure 6:
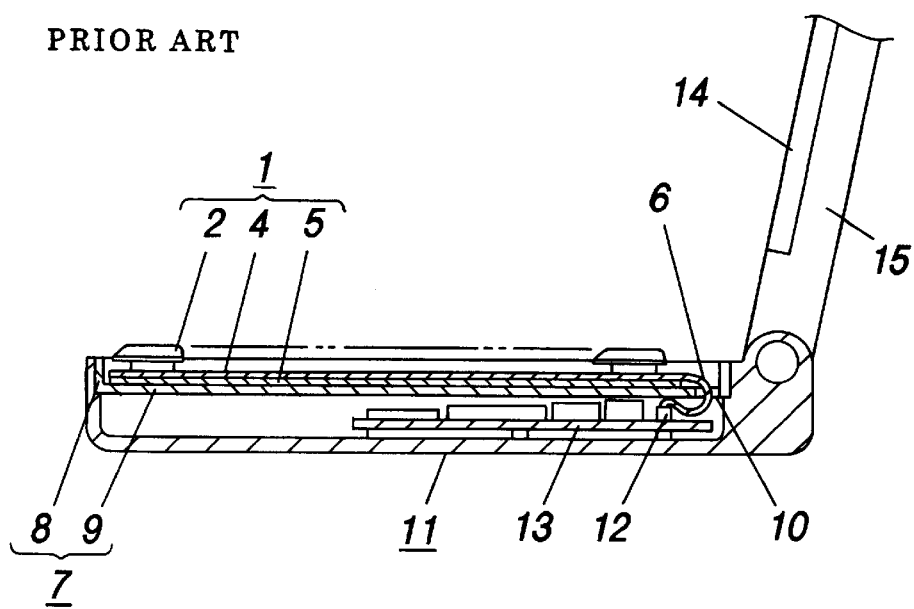
FIG. 6 is a cross sectional side view of a conventional portable personal computer.
Figure 7A:
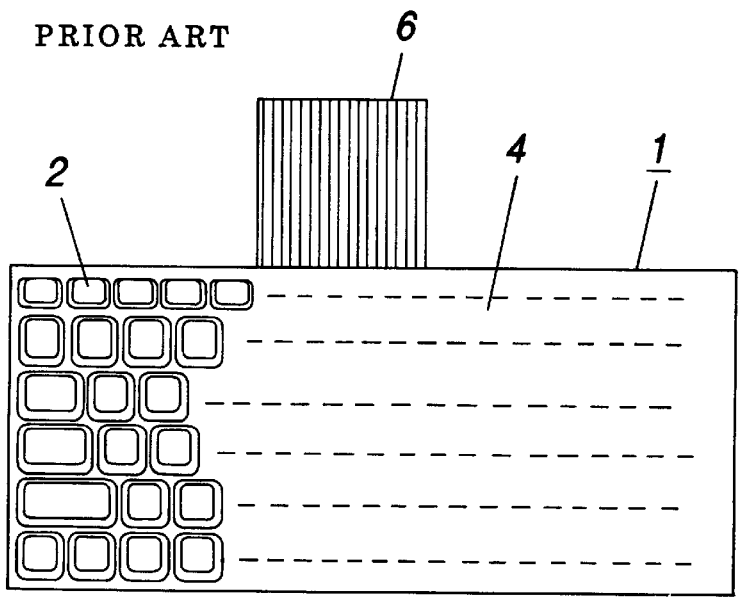
FIG. 7A and FIG. 7B show the keyboard switch, a plan view and a magnified view in the switching portion, respectively.
Figure 7B:
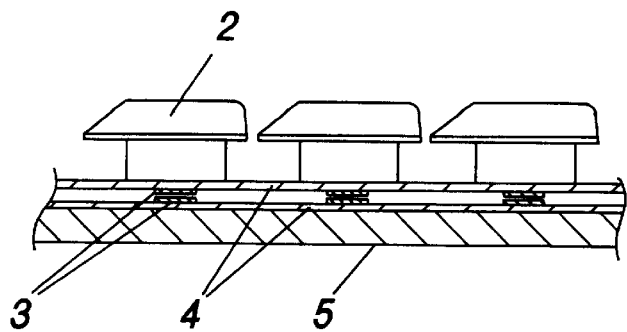
Figure 8:
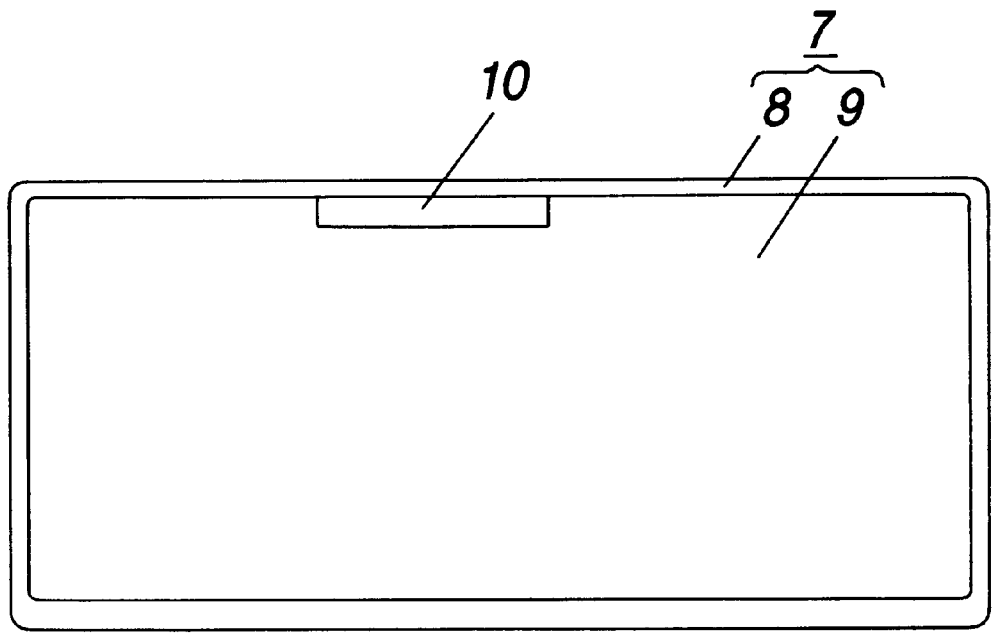
FIG. 8 and FIG. 9 are plan views of an upper case and a bottom case, respectively, of the conventional personal computer.
Figure 9:
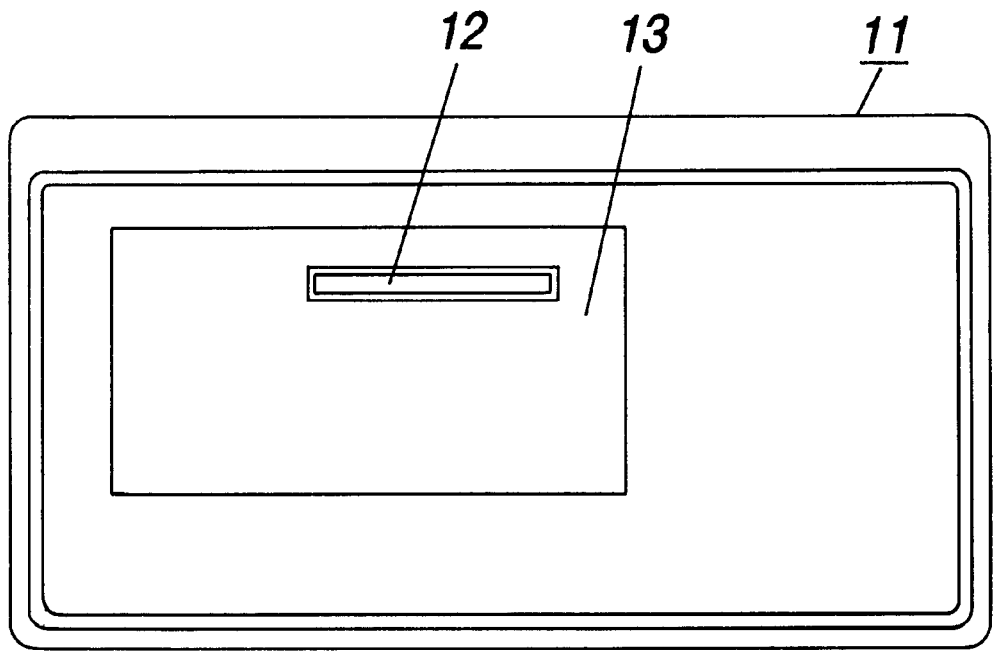
Figure 10:
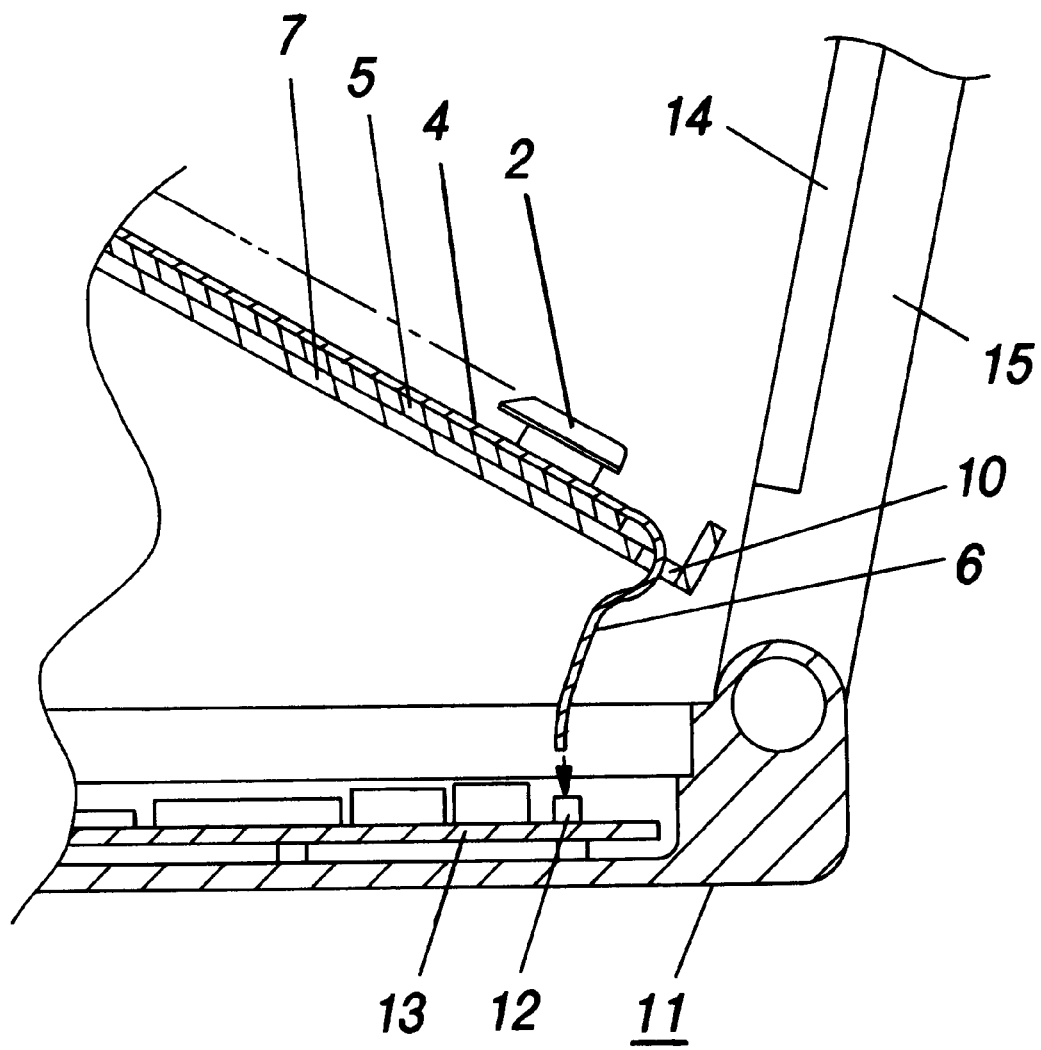
FIG. 10 is a cross sectional side view used to describe connection of the connector sheet of the keyboard switch.

The basic structure of a portable personal computer in accordance with a second exemplary embodiment of the present invention shown in FIG. 5 remains the same as that of embodiment 1; but the difference is in the arrangement of the supporting protrusion. Namely, a protrusion 27 protruding within the opening 26 of the bottom board 25 of upper case 24 for supporting the baseboard 5 of keyboard switch 16 is erecting upright on the bottom surface 29 of bottom case 28 as the constituent part.

In fabricating a personal computer, the thin keyboard switch 16 is placed in the upper case 24 so that the connector sheet 17 is pulled downward out of the upper case 24 through the opening 26, and then the connector sheet 17 is folded down forward to be inserted and fixed at the tip end in the connector 12. The upper case 24 is housed and fixed at the upper part of the bottom case 11. At this stage, the connector sheet 17 is organized so that the supporting protrusion 27 penetrates through the hole 18 of connector sheet 17 to make direct contact with the bottom surface of baseboard 5.

As described in the above, the operation of connecting the connector sheet 17 to the circuit board 13, during mounting of keyboard switch 16, becomes easier by providing an opening 26 and a hole 18 of the connector sheet 17 to be large enough with a sufficient margin. In the meantime, because the protrusion 27 is erecting upright from the bottom board of bottom case 11 in an area within the opening 26 of upper case 24, the keyboard switch 16 can withstand a stronger force even if a push button 2 locating in an area above the opening 26 is wildly pressed.

Although a portable personal computer has been used as the example in the above described embodiments, the present invention may of course be embodied also into various other types of electronic equipment comprising a thin keyboard switch such as a word processor.

What is claimed is:

1. An electronic equipment incorporating a keyboard switch comprising:

a keyboard switch having a baseboard and a plurality of push buttons disposed on the baseboard, with a gap between the baseboard and the push buttons, the baseboard having a bottom surface;

a connector sheet extends from the gap between the baseboard and push buttons, the connector sheet having at least one hole at a middle location in the width direction;

an upper case including a surrounding frame portion and a bottom board for housing the keyboard switch, the upper case having an opening at one end of the bottom board adapted for the connector sheet to pass through;

a circuit board;

a connector means for connecting to an end of the connector sheet;

a bottom case for housing the keyboard switch and the upper case at an upper portion, and for housing at a lower portion the circuit board and the connection means; and a protrusion provided within said opening of the upper case for supporting the baseboard of the keyboard switch from the bottom surface, and the protrusion penetrating through said at least one hole of the connector sheet.

2. The electronic equipment incorporating a keyboard switch recited in claim 1, wherein said protrusion is protruding from the frame portion of said upper case as a constituent part towards said opening.

3. The electronic equipment incorporating a keyboard switch recited in claim 1, wherein said protrusion is protruding erected upright from a bottom surface of said bottom case as a constituent part towards said opening.

4. The electronic equipment incorporating a keyboard switch recited in claim 1, wherein a size of said opening is larger than that needed for allowing said connector sheet to pass through.

5. The electronic equipment incorporating a keyboard switch recited in claim 2, wherein a size of said opening is larger than that needed for allowing said connector sheet to pass through.

6. The electronic equipment incorporating a keyboard switch recited in claim 3, wherein a size of said opening is larger than that needed for allowing said connector sheet to pass through.

* * * * *